April 2, 1963  H. M. FOX  3,083,527
HYBRID ROCKET PROPULSION PROCESS
Filed Oct. 10, 1960  2 Sheets-Sheet 1

INVENTOR.
H. M. FOX
BY Hudson and Young
ATTORNEYS

April 2, 1963        H. M. FOX        3,083,527

HYBRID ROCKET PROPULSION PROCESS

Filed Oct. 10, 1960        2 Sheets-Sheet 2

INVENTOR.
H.M. FOX

BY Hudson and Young

ATTORNEYS

United States Patent Office 3,083,527
Patented Apr. 2, 1963

3,083,527
HYBRID ROCKET PROPULSION PROCESS
Homer M. Fox, Bartlesville, Okla., assignor to Phillips
Petroleum Company, a corporation of Delaware
Filed Oct. 10, 1960, Ser. No. 61,772
8 Claims. (Cl. 60—35.4)

This invention relates to rocket motors adapted to develop high specific impulse characteristics. In one aspect this invention relates to rocket motors utilizing solid propellants containing therein high energy elements such as finely divided metals. In another aspect this invention relates to a method for increasing the specific impulse of a rocket motor without appreciably increasing the temperature of the combustion gases, particularly those combustion gases which contact metallic portions of the rocket motor.

Solid propellant rocket motors have been used for many years but have not been considered competitive to liquid propellant rocket motors because the specific impulse of solid propellant rocket motors is generally considerably lower than the specific impulse of liquid propellant rocket motors. The specific impulse, or thrust per unit weight of propellant, is proportional to the square root of the temperature of the combustion products and is inversely proportional to the square root of the average molecular weight of exhaust products. For obvious reasons it is desirable to provide rockets with a specific impulse as high as possible; however, there are several problems which have heretofore been considered to be insurmountable. One apparently inherent limitation in achieving high specific impulse characteristics in a solid propellant rocket motor is that those combustion systems which produce low molecular weight products do not always attain very high temperatures. It has been proposed to add high energy elements in the form of powdered metals such as aluminum, boron magnesium, and the like, to composite solid propellants made up of solid inorganic oxidizing salts incorporated into a rubbery binder which also acts as a fuel component in the propellant system. Nonmetallic, high energy elements such as silicon are to be included in the term "powdered metals" where such elements are employed for the purpose of increasing the specific impulse of solid propellant compositions. The addition of powdered metals to a composite solid propellant greatly increases the temperature of the reaction products so that the specific impulse is increased, in spite of the fact that the metals introduce high molecular weight products into the exhaust. While the addition of powdered metal to a composite solid propellant is a step in the direction of increasing specific impulse of solid propellants, it does not provide a solution to the problem because available materials of construction limit the upper temperature of the exhaust gases so that the amount of powdered metal which can be incorporated into the propellant is limited by the temperature attained in the product gases even though means have been proposed for cooling the propulsion nozzle and adjacent apparatus. The means proposal for cooling the propulsion nozzle and adjacent apparatus have added considerably to the complexity and weight of the rocket, thus offsetting, to some extent the purpose for which the powdered metals have been added.

I have now discovered that if ammonia or hydrazine is injected into the combustion gases resulting from combustion of a composite solid propellant containing therein high energy solid fuel components such as powdered metal, the temperature of the combustion gases can be substantially reduced without a corresponding reduction of specific impulse. Thus, a powdered metal such as aluminum can be incorporated into a composite solid propellant so that the temperature of the combustion gases is greatly increased and the specific impulse of the propellant is concomitantly increased as a result of the increase in temperature. The temperature of the combustion gases, however, may be considerably higher than the propulsion nozzle and other metallic elements can tolerate. Ammonia or hydrazine can now be added to the combustion gases in an amount sufficient to reduce the temperature of the combustion gases to a temperature which can be tolerated by the propulsion nozzle and other metallic elements. The specific impulse of such propellant system will be considerably higher than that of a solid propellant without benefit of the added metal at comparable temperatures.

In the operation of a solid propellant rocket motor wherein a powdered metal or other high energy element is incorporated into the solid propellant charge, the ammonia or hydrazine is preferably injected into the exhaust stream at or near the propulsion nozzle throat so that only the exhaust gases adjacent the propulsion nozzle are cooled. In this manner only a portion of the exhaust gases is reduced in temperature and a smaller amount of ammonia or hydrazine is required. Furthermore, the specific impulse of only a portion of the exhaust gases is reduced. If desired, however, the ammonia or hydrazine can be injected into the combustion chamber so that the temperature of the total combustion products is reduced and even then a net increase in specific impulse will be realized. Thus, according to the invention, there is a net increase in specific impulse at any given temperature of exhaust products. Although I do not intend to be bound by the theory of the operation of my invention, I believe that the net increase in specific impulse at the lower temperature level according to my invention results from the reduction of average molecular weight of the exhausted gases because ammonia or hydrazine and their decomposition products are relatively low molecular weight materials. Since the ammonia, or hydrazine, is injected into the combustion gases the combustion of the solid propellant is not affected because combustion occurs at the surface of the solid propellant. Thus the addition of a fuel component to the combustion gases does not change the oxidizer to fuel ratio of the solid propellant.

It is therefore a principal object of this invention to provide a method for increasing the specific impulse of solid propellants without a concomitant increase in the temperature of the combustion gases. It is also an object of this invention to provide a method for decreasing the temperature of combustion gases adjacent the exhaust nozzle of a rocket motor without introducing a corresponding decrease in the specific impulse of those gases. Still another object of the invention is to provide a solid propellant rocket system wherein the solid propellant contains powdered metals and other high energy components and wherein the temperature of the combustion gases is not substantially increased by the presence of such high energy components. Other objects and advantages of this invention will be apparent to one skilled in the art upon study of this disclosure including the detailed description of the invention and the attached drawing wherein:

Figure 1:
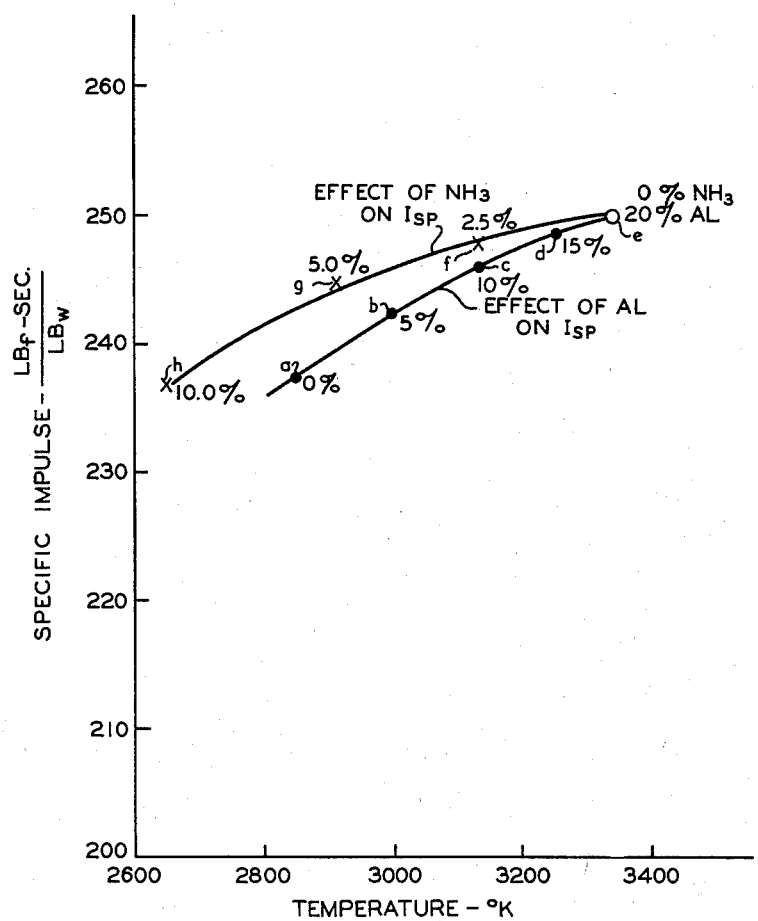
FIGURE 1 is a graphic illustration of the effects of ammonia and aluminum on the specific impulse and temperature of a solid propellant composition.

The lower curve of FIGURE 1 illustrates the effects of incremental additions of aluminum at points $b$, $c$, $d$ and $e$ on the specific impulse Isp and temperature of a solid propellant having the properties represented by point $a$. The upper curve illustrates the effects of incremental additions of ammonia at points $f$, $g$ and $h$ on the properties of the aluminum-containing propellant represented by point $e$. Incremental additions of ammonia to the combustion products of the propellant represented by any one of the points $b$, $c$ or $d$ results in a curve having a slope intermediate any two boundary curves including the upper and lower curves of FIGURE 1. Such curves are not shown because it will be desirable to determine the proper amount of ammonia or hydrazine injection for each propellant composition contemplated.

Figure 2:
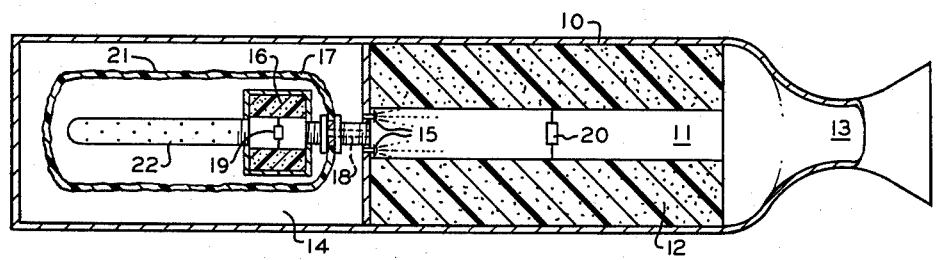
FIGURE 2 is a schematic sectional elevation of a rocket motor illustrating one embodiment of this invention.

As an example of one embodiment of a rocket motor adapted to practice this invention, reference is made to FIGURE 2 wherein a rocket motor 10 is schematically illustrated. Combustion chamber 11 contains solid propellant charge 12 which provides thrust for the rocket motor by autocombustion and evolution of gases which are exhausted through propulsion nozzle 13. Container 14 contains the coolant, such as ammonia. Nozzles 15 communicate with tank 14 and combustion chamber 11 and are closed, for example, by fusible plugs which are melted upon ignition of the propellant charge and allow ammonia to flow into the combustion chamber. An auxiliary charge of solid propellant 16 is positioned in an auxiliary combustion chamber 17 within propellant tank 14 in communication with main combustion chamber 11 by means of orifice 18. Ignition means indicated at 19 and 20 are positioned so as to ignite simultaneously solid propellant charges 16 and 12. Expellant bag 21 is attached to the container of the coolant charge in tank 14 and perforated tube 22 connects the interior of auxiliary combustion chamber 17 with the interior of expellant bag 21.

The auxiliary propellant charge 16 is adapted to burn for a period of time at least equal to that of the main propellant charge 12. This can be done in various ways, for example, by utilizing a propellant for the charge 16 which is slower burning than the charge 12. An ammonium nitrate/diene vinylpyridine copolymer propellant charge can be rendered slower burning by omitting the burning rate catalyst. Another method for providing a burning charge 16 having the same burning time as that of the propellant charge 12 is by utilizing an end-burning charge 16. Other methods can also be utilized for providing a charge 16 having a burning time at least as long as that of charge 12.

Expellant bag 21 can be made of any flexible material which is not affected by ammonia or hydrazine, such as polymerized tetrafluoroethylene, polybutadiene and polyethylene. A flexible metal bellows can also be used.

Orifice 18 in auxiliary combustion chamber 17 is calibrated so that the pressure developed in chamber 17 is greater than that developed in chamber 11 so that the coolant is injected into the combustion chamber 11 at high velocity. The orifice 18 prevents generation of excessive pressure in container 14.

Figure 3:
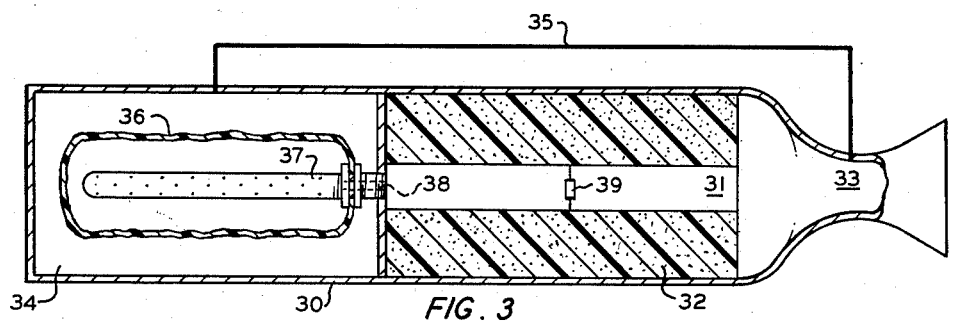
FIGURE 3 is a schematic sectional elevation of a rocket motor illustrating another embodiment of this invention.

Another embodiment of the invention is shown in FIGURE 3 wherein a rocket motor 30 is schematically illustrated. Combustion chamber 31 contains solid propellant charge 32 which provides thrust for the rocket motor by evolution of gases which are exhausted through exhaust nozzle 33. Container 34 contains the coolant such as ammonia or hydrazine. A conduit 35 connects container 34 and the throat of nozzle 33. Conduit 35 can be closed, for example, by a fusible plug at the throat of nozzle 33 so that the fusible plug is melted upon ignition of the propellant charge and allows the coolant to flow into the nozzle throat. Expellant bag 36 is attached to the coolant container 34 and perforated tube 37 connects the interior of combustion chamber 31 with the interior of expellant bag 36 by way of orifice 38. Ignition means 39 is utilized to ignite the propellant charge 32. The pressure at the throat of nozzle 33 is lower than that of combustion chamber 31 so that the pressure of the combustion chamber exerted upon the interior of the expellant bag 36 causes coolant to flow from the container 34 into the nozzle 33. Instead of a single conduit outlet at the throat of nozzle 33, a plurality of small-pore passages around the periphery of the nozzle throat would provide film cooling of the nozzle throat.

Instead of a flexible expellant bag 36, a simple piston such as illustrated in my Patent 2,868,127 issued January 13, 1959 can be employed to displace coolant from the container 34.

A conduit such as 35 of FIGURE 3 can be used in FIGURE 2 so that ammonia can be injected into the combustion chamber and into the nozzle throat simultaneously.

The invention is applicable to any rocket motor employing a propellant which, by autocombustion, produces high molecular weight combustion gases at high temperature. The invention has particular utility when applied to a rocket motor powered by a solid propellant containing a high energy element such as aluminum, magnesium, silicon, titanium, beryllium, boron, decaborane and lithium. Although these high energy elements can be incorporated into any type of solid propellant, they usually will be incorporated, in powdered form, into composite or heterogeneous solid propellants comprising a solid oxidant and an organic binder which also acts as a reductant.

A composite solid propellant can be defined as a solid mixture of an oxidizer and a fuel in proportions such that the solid is capable of continuously producing gas when ignited by virtue of its self-contained oxidizer and fuel. Although it would be desirable to have the oxidizer and fuel in stoichiometric balance this ordinarily cannot be obtained in the conventional composite solid propellants because more binder is required to make an acceptable solid than the stoichiometric amount and therefore a composite solid propellant is invariably rich in fuel component or in other words deficient in oxygen.

The oxidant utilized in composite propellants can be selected from a number of suitable oxidants some examples of which are hexanitroethane, ammonium nitrate, ammonium perchlorate, potassium perchlorate, ammonium nitroform, hydroxylamine nitrate, hydrazine nitrate and the like.

The organic binder material utilized in the preparation of composite propellants can be selected from a number of materials some examples of which are rubber, including natural rubber and synthetic rubber such as polysulfide rubber, polybutadiene, copolymers of butadiene and styrene, copolymers of conjugated dienes and heterocyclic nitrogen bases, and the like. Other binder materials include the various polyurethanes, polyvinylchloride, polyvinylacetate and other thermoplastic and thermosetting organic compounds.

Burning rate catalysts such as ammonium dichromate and complex cyanides of metals are often incorporated into composite propellant compositions.

Solid propellant compositions comprising an inorganic oxidizing salt with a binder comprising a copolymer of a conjugated diene and a heterocyclic nitrogen base are described in U.S. Patent 2,941,878, issued to Phillips Petroleum Company on June 21, 1960.

Polyurethane compositions are well known; however, two formulations are shown in the following Table I:

*Table I*

| Ingredients | Parts by Weight | |
|---|---|---|
| | Composition #1 | Composition #2 |
| Castor oil | 57.14 | 56.31 |
| Neopentyl glycol | 10.86 | |
| Tolylene diisocyanate | 32.00 | 32.43 |
| Hexylene glycol | | 11.26 |

The data which are presented graphically in FIGURE 1 were obtained utilizing propellant compositions having a polyurethane binder according to Table II.

*Table II*

| Ingredients: | Parts by weight |
|---|---|
| Ethylene-propylene glycol [1] | 73.34 |
| N,N,N',N'-2-hydroxypropyl ethylenediamine | 4.05 |
| Tolylene diisocyanate | 12.61 |
| Isodecylpelargonate | 10.0 |

[1] A 50–50 copolymer of propylene glycol and ethylene glycol and having a hydroxyl number of 42.

The polyurethane binder as described in Table II is employed in the preparation of a composite solid propellant in the ratio of 17.5 weight percent binder and 82.5 weight percent of a mixture of ammonium perchlorate and powdered aluminum such that the aluminum is present in the total propellant in the amount shown on FIGURE 1, i.e., 0 to 20 weight percent aluminum.

A solid propellant which is particularly applicable is one comprising a solid inorganic oxidizing salt and a nitramine polyurethane binder because the binder contains oxygen and the propellant composition can accommodate more elemental high energy fuel. The nitramine polyurethane binder compositions are prepared by the interaction of an organic polyisocyanate with a linear methylene nitramine diol, more specifically, 3,11-dioxa-5,7,9-trinitrazadecane-1,13-diol. These binder compositions are described and claimed in copending application Serial No. 4,574 filed January 25, 1960 by Claude G. Long et al. A general formulation for such propellant compositions is as follows:

| | Parts by Weight | Weight percent |
|---|---|---|
| Binder: | | |
| Nitramine Polyurethane | 100 | |
| Plasticizer | 0–250 | |
| Antioxidant | 0–25 | 10–60 |
| Wetting Agent | 0–25 | |
| Curing Catalyst | 0–5 | |
| Casting Aid | 0–5 | |
| Oxidizer | | 90–40 |
| High Energy Element | | 0–30 |
| Combustion Catalyst | | 0–30 |

The high energy element and combustion catalyst are usually substituted for a portion of the oxidizer.

It will be obvious to those skilled in the art that various modifications of the invention are possible without departing from the spirit and scope of the invenition.

That which is claimed is:

1. The method of increasing the specific impulse developed by ejecting from a rocket motor the gaseous products of combustion of a solid rocket propellant which method comprises incorporating a high energy fuel component selected from the group consisting of aluminum, magnesium, silicon, titanium, beryllium, boron, decaborane, and lithium into said solid propellant so as to increase the temperature of the combustion gases produced; and injecting a nitrogen compound selected from the group consisting of ammonia and hydrazine into the combustion gases in said rocket motor to reduce the temperature of the combustion gases and to result in a net increase in specific impulse over that obtained without said high energy fuel.

2. The method of claim 1 wherein ammonia is injected into the rocket motor.

3. The method of claim 1 wherein hydrazine is injected into the rocket motor.

4. The method of claim 1 wherein the nitrogen compound is injected into the combustion chamber of the rocket motor.

5. The method of claim 1 wherein the nitrogen compound is injected into the exhaust nozzle throat of the rocket motor.

6. The method of claim 1 wherein the nitrogen compound is injected into both the combustion chamber and the nozzle throat of the rocket motor.

7. In the method of producing thrust by ejecting from a rocket motor the gaseous products of combustion by the autocombustion of a solid rocket propellant which contains a high energy fuel component selected from the group consisting of aluminum, magnesium, silicon, titanium, beryllium, boron, decaborane, and lithium the improvement which comprises injecting into the combustion gases a nitrogen compound selected from the group consisting of ammonia and hydrazine.

8. The method of utilizing a solid rocket propellant containing a high energy fuel component selected from the group consisting of aluminum, magnesium, silicon, titanium, beryllium, boron, decaborane, and lithium in a rocket motor which will not tolerate the high temperature combustion products of such propellant which method comprises injecting into the combustion gases in said motor a nitrogen compound selected from the group consisting of ammonia and hydrazine in an amount sufficient to reduce the temperature of the combustion gases to a temperature which the motor will tolerate.

References Cited in the file of this patent

UNITED STATES PATENTS

| 2,544,422 | Goddard | Mar. 6, 1951 |
| 2,919,541 | Mahan | Jan. 5, 1960 |
| 2,929,200 | Wasserbach et al. | Mar. 22, 1960 |
| 2,949,009 | D'Ooge | Aug. 16, 1960 |
| 2,983,099 | Doumani | May 9, 1961 |
| 2,984,973 | Stegelman | May 23, 1961 |